United States Patent Office 3,155,685
Patented Nov. 3, 1964

3,155,685
PREPARATION OF ESTER LACTONES
Erhard J. Prill and James C. Wygant, Dayton, Ohio, assignors to Monsanto Company, a corporation of Delaware
No Drawing. Filed Jan. 4, 1960, Ser. No. 34
7 Claims. (Cl. 260—343.5)

This invention relates to ester lactones of unsaturated acid esters. In another respect, this invention relates to unsaturated acid esters of alkenylsuccinic anhydrides. In another respect, this invention relates to methods for producing unsaturated acid esters of alkenylsuccinic anhydrides. In another respect, this invention relates to methods for lactonization of unsaturated acid esters to form ester lactones. In another respect, this invention relates to polyvinyl halide resin compositions containing a plasticizing amount of an ester lactone and methods for producing the same.

The preparation of lactones from $\gamma$- and $\Delta$-keto acids by reduction with sodium and alcohol or by use of a Raney-nickel catalyst is well known. The presence of other functional groups such as halo, carboxy, and the like substituted on the keto acids usually is detrimental to the formation of the lactone. Therefore, the formation of lactones substituted with an ester group, as well as other constituents, can not be accomplished in good yield by the processes known to the prior art.

An object of this invention is to provide a process for reacting an alkenylsuccinic anhydride with a monohydric alcohol to form an ester lactone.

Another object of this invention is to provide a process for esterifying alkenylsuccinic anhydrides to form unsaturated acid esters of said alkenylsuccinic anhydrides without substantial formation of the diesters thereof.

Another object of this invention is to provide a process for lactonization of the unsaturated acid esters of alkenylsuccinic anhydrides to form ester lactones.

Another object of this invention is to provide unsaturated acid esters of alkenylsuccinic anhydrides as new products.

Another object of this invention is to provide ester-substituted $\gamma$- and $\Delta$-lactones as new products.

Another object of this invention is to provide methods for plasticizing polyvinyl halide resins by incorporating therewith a plasticizing amount of an ester-substituted lactone.

Another object of this invention is to provide polyvinyl halide resin compositions containing a plasticizing amount of an ester-substituted lactone.

Other objects and advantages of this invention will be apparent to one skilled in the art upon studying this disclosure.

In accordance with this invention, a 2-alkenylsuccinic anhydride is reacted with a monohydric alcohol to form an ester-substituted lactone. The reactants are initially reacted preferably in the absence of a catalyst and then an acid-type catalyst is employed to complete the reaction. The initial phase of the reaction involves opening of the cyclic ring of the 2-alkenylsuccinic anhydride and partial esterification thereof as illustrated by Equation 1:

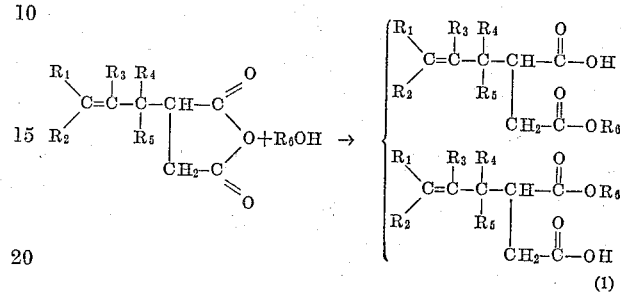

(1)

The reaction results primarily in the formation of only one acid ester product; however, more than one acid ester product is sometimes formed in the reaction, as shown in the above equation, depending upon where in the cyclic chain the opening thereof is effected. The final phase of the reaction requires the use of a catalyst and involves intramolecular cyclization of the acid ester to form a lactone substituted with an ester group, as illustrated by Equation 2:

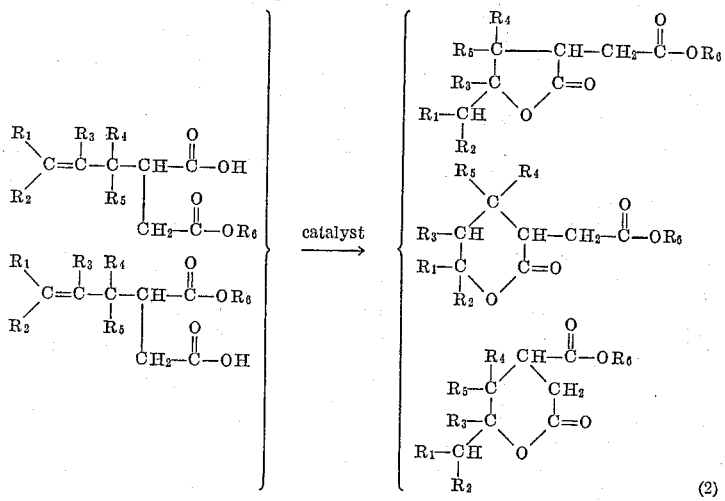

(2)

The use of the catalyst in the initial phase of the reaction tends to result in the formation of diesters, instead of acid esters or partial esters, and the formation of the diester prevents the intramolecular cyclization in the final phase to form the ester lactone.

Further, in accordance with this invention, there are provided, as new compounds, ester-substituted lactones of the formula

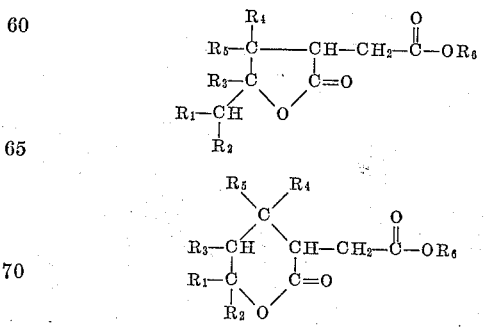

or

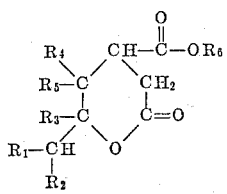

wherein $R_1$, $R_2$, $R_3$, $R_4$, and $R_5$ are selected from the group consisting of hydrogen, hydrocarbyl, hydrocarbyloxy, halohydrocarbyl, halohydrocarbyloxy, hydrocarbyloxyalkyl, carboalkoxy, acyl, carboalkoxyalkyl, cyano, cyanohydrocarbyl, carboxy, carboxyalkyl, and acyloxy radicals of less than 32 carbon atoms and free of non-benzenoid unsaturation, each of said $R_1$, $R_2$, $R_3$, $R_4$ and $R_5$ being the same or different, and $R_6$ is selected from the group consisting of hydrocarbyl, hydrocarbyloxyalkyl, alkoxyethoxyalkyl, acyloxyalkyl, and halohydrocarbyl radicals of less than 18 carbon atoms and free of non-benzenoid unsaturation. These ester-substituted lactones may be described as being valerolactones; the first lactone above being a γ-valerolactone, the second being a Δ-valerolactone, and the last being a γ-methyl-Δ-valerolactone. Although all three lactones may be formed as products in the reaction, the predominant product is the γ-valerolactone; that is, the product having the formula

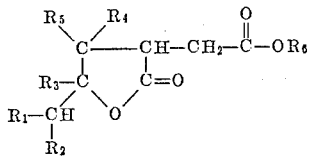

Further, in accordance with this invention, there is provided a method for plasticizing polyvinyl halide resins by incorporating with said resins a plasticizing amount of an ester-substituted lactone of the formula

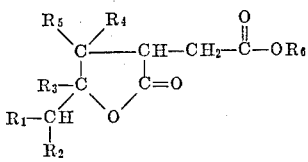

wherein $R_1$, $R_2$, $R_3$, $R_4$, $R_5$, and $R_6$ are as above defined.

Further, in accordance with this invention, there are provided improved polyvinyl halide resin compositions comprising polyvinyl halide resin and a plasticizing amount of an ester-substituted lactone of the formula

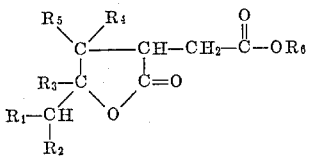

wherein $R_1$, $R_2$, $R_3$, $R_4$, $R_5$, and $R_6$ are as above defined.

The 2-alkenylsuccinic anhydride reactants suitable for use in this invention can have either a straight-chain or a branched-chain alkenyl group but the double bond of the alkenyl group must be located in the 2-position. For example, the alkenyl group can be a 2-propenyl, 2-methylallyl, 2-butenyl, 2-pentenyl, or the like. Succinic anhydrides substituted with a branched-chain alkenyl group, including alkenyl groups which are substituted with other groups besides those containing only carbon and hydrogen, are also very suitable reactants. Thus, the $R_1$, $R_2$, $R_3$, $R_4$, and $R_5$ radicals can be either hydrogen; hydrocarbyl radicals, including alkyl radicals such as methyl, ethyl, hexyl, decyl, undecyl, pentadecyl, tricosyl, hexacosyl, dotricontyl, isobutyl, 5-methylhexyl, and 2-methyldecyl, aryl radicals such as phenyl, alkaryl radicals such as methylphenyl, diethylphenyl, isopropylphenyl and tert-amylphenyl; and aralkyl radicals such as benzyl, amylbenzyl, phenylethyl, and phenylpropyl; hydrocarbyloxy radicals, including alkoxy radicals such as methoxy, ethoxy, butoxy, isopentyloxy, n-dodecyloxy, n-octyloxy and ethylhexyloxy, alkylaroxy radicals such as octylphenoxy, dodecylphenoxy, methylphenoxy, and diethylphenoxy, aroxy radicals such as phenoxy, arylalkoxy radicals such as benzyloxy, methylbenzyloxy, phenylethoxy, phenylbutoxy and methylphenylethoxy; halohydrocarbyl radicals where the halogen is either chlorine, bromine, iodine or fluorine, including haloalkyl radicals such as 2-chloroethyl, 3,3-dibromobutyl, 3-iodo-5-ethylhexyl, and 2,3-difluorooctyl, haloaryl radicals such as 2-chlorophenyl, 2,4-dibromophenyl, 4-iodophenyl, 2,4-difluorophenyl, haloalkaryl radicals such as 2-chloro-4-methylphenyl, 2,4-dibromo-3-ethylphenyl, 2-iodo-4-methylphenyl, and 2-fluoro-4-propylphenyl, haloaralkyl radicals such as chlorofluoro-4-propylphenyl, haloaralkyl radicals such as chlorobenzyl and bromobenzyl; halohydrocarbyloxy radicals including haloalkoxy radicals such as chloromethoxy, bromobutoxy, iodoethoxy, and fluoromethoxy, haloalkylaroxy radicals such as chlorooctylphenoxy and bromooctylphenoxy, haloaroxy radicals such as chlorophenoxy, bromophenoxy, iodophenoxy, and fluorophenoxy, and haloarylalkoxy radicals such as chlorobenzyloxy and bromobenzyloxy; hydrocarbyloxyalkyl radicals including alkoxyalkyl radicals such as 2-methoxyethyl, 3-ethoxy-n-propyl, 4-butoxybutyl, and 2,3-di-n-octyloxypropyl, aroxyalkyl radicals such as phenoxymethyl and phenoxyethyl, alkylaroxyalkyl radicals such as methylphenoxyethyl and octylphenoxymethyl radicals, and arylalkoxyalkyl radicals such as benzyloxymethyl, phenylethoxymethyl and methylphenylbutoxyethyl; carboalkoxy radicals such as carbomethoxy and carboethoxy; acyl radicals such as formyl, acetyl, propionoyl, heptanoyl, decanoyl, benzoyl and phenylacetyl; carboalkoxyalkyl radicals such as carboethoxyethyl, carbo-n-propyloxybutyl, carbobutoxypropyl, carbomethoxyamyl and carbohexoxyethyl; cyano radicals; cyanohydrocarbyl radicals including cyanoalkyl radicals such as cyanomethyl and cyanopropyl and cyanoaryl radicals such as cyanophenyl and dicyanophenyl; carboxy radicals; carboxyalkyl radicals such as carboxyethyl, carboxybutyl, carboxyoctyl, carboxydecyl, and 3-carboxybutyl; and acyloxy radicals such as formyloxy, acetyloxy, propionoyloxy, benzoyloxy, heptanoyloxy, and decanoyloxy.

This invention is not limited by the number of carbon atoms in each of the $R_1$, $R_2$, $R_3$, $R_4$ and $R_5$ radicals and radicals containing any number of carbon atoms can be used; however, preferably, radicals having fewer than 32 carbon atoms are employed. Also, other hydrocarbyl radicals can also be employed in the process of this invention provided the hydrocarbyl radicals are free of non-benzenoid unsaturation; that is, olefinic and acetylenic unsaturation.

The 2-alkenylsuccinic anhydride reactants wherein the alkenyl group is a branched-chain structure are preferably produced by the addition of an olefin or a lower olefin dimer, trimer, tetramer or pentamer to maleic anhydride as is well known to those skilled in the art. These lower olefins, such as propylene, butylene, and isobutylene, form polymers which result from polymerization of the olefin with sulfuric acid or metallic halides or which result from the simultaneous dehydration and polymerization of the tertiary alcohols by concentrated sulfuric acid. Thus, tetrapropenylsuccinic anhydride is formed by the addition of propylene tetramer to maleic anhydride and, in a similar manner, diisobutenylsuccinic anhydride is formed from diisobutylene dimer and maleic anhydride.

Illustrative examples of suitable monohydric alcohols for use in this invention include the hydrocarbyl alcohols such as the alkyl alcohols, e.g., methyl, ethyl, isopropyl, hexyl, decyl, dodecyl, tridecyl, and octadecyl alcohol, the cycloalkyl alcohols, e.g., cyclopentyl and cyclohexyl alcohols, the (cycloalkyl)alkyl alcohols, e.g., cyclohexylethyl, cyclohexylbutyl, and cyclopentylpropyl alcohols, the (alkyl)cycloalkyl alcohols, e.g., 1-methylcyclohexylmethyl, 1-(1'-methylcyclohexyl)-1-ethyl, and 1-(2'-ethylcyclohexyl)-3-propyl alcohols, the aryl alcohols such as phenyl alcohol, the alkaryl alcohols, e.g., methylphenyl, ethylphenyl, and dipropylphenyl alcohols, and the aralkyl alcohols, e.g., benzyl, butylbenzyl, phenylethyl, and phenylbutyl alcohols; the hydrocarbyloxyalkyl alcohols such as the alkoxyalkyl, e.g., 2-ethoxyethyl, 2-butoxyethyl, 2-methoxyethyl and 2-isopropyloxyethyl alcohols and the aroxyalkyl alcohols, e.g., phenoxymethyl and phenoxyethyl alcohols; the alkoxyethoxyalkyl alcohols, e.g., 2-(methoxyethoxy)ethyl, 2-(ethoxyethoxy)ethyl and 2-(butoxyethoxy)-ethyl alcohols; the acyloxyalkyl alcohols, e.g., acetoxyethyl, benzoyloxybutyl, and phenacetoxyethyl alcohols; and the halohydrocarbyl alcohols, such as the haloalkyl alcohols, e.g., 2-chloroethyl, 2-bromopropyl, 4-iodobutyl, and 3-fluoropropyl alcohols, the halocycloalkyl alcohols, e.g., chlorocyclopentyl, bromocyclohexyl, and iodocyclohexyl alcohols, the halo(cycloalkyl)alkyl alcohols, e.g., 2-chlorocyclohexylethyl, and 2-bromocyclohexylbutyl alcohols, the halo(alkyl)cycloalkyl alcohols, e.g., 1-(2'-chloro-3'-methylcyclohexyl)-3-propyl and 1-(1'-bromo-2'-ethylcyclohexyl)-1-ethyl alcohols, the haloaryl alcohols such as 2-chlorophenyl, 3-bromophenyl, and 2,4-diiodophenyl alcohols, the haloalkaryl alcohols, e.g., 2-chloro-3-methylphenyl and 2-bromo-4-ethylphenyl alcohols, and the haloaralkyl alcohols e.g., 2-chlorobenzyl and 2-bromo-4-butylbenzyl alcohols.

Although the alcohol used in the process of this invention may have as many as 32 carbon atoms in the molecule, preferably the alcohol is one which has less than 18 carbon atoms per molecule. The alcohol may be a straight-chain or a branched-chain one, and can be either a primary, secondary or tertiary alcohol. A very suitable type of branched-chain alcohol is the "Oxo" type alcohol produced by oxonation of an olefin or a lower olefin dimer, trimer, tetramer, or pentamer with carbon monoxide and hydrogen at a temperature between about 250° C. and 450° C. under a pressure of about 150–400 atm. in the presence of a cobalt or similar catalyst to form an aldehyde which is then catalytically hydrogenated to form an alcohol as is well known to those skilled in the art. For example, tridecyl alcohol is prepared from propylene tetramer or isobutylene trimer and carbon monoxide and hydrogen whereas hexadecyl alcohol is prepared from propylene pentamer and carbon monoxide and hydrogen.

The esterification and intramolecular cyclization reactions of this invention are usually carried out at a temperature below about 150° C. because the use of more elevated temperatures results in the formation of a substantial amount of the diester of the succinic anhydride. The reaction can be conducted at temperatures as low as approximately room temperature, e.g., 20° C., particularly when using low molecular weight alkenylsuccinic anhydrides and alcohols; however, it is usually desirable to use a temperature above room temperature in order to have relatively short reaction times. Ordinarily, these reactions are carried out at substantially atmospheric pressure although pressures above atmospheric may be employed with the more volatile reactants.

Usually, stoichiometric amounts of the alkenylsuccinic anhydride and alcohol reactants are maintained in the reaction zone. However, it is sometimes desirable to use an excess of the alcohol reactant in order to drive the anhydride-opening step to completion. It is also possible to use an excess of the alkenylsuccinic anhydride although the use of an excess of this reactant is usually not desirable since the unreacted alkenylsuccinic anhydride must be recovered in the purification step.

The partial esterification step of the process of this invention should be conducted in a catalyst-free system since the use of a catalyst promotes the addition of 2 moles of the alcohol reactant to each mole of the succinic anhydride reactant, thereby effecting complete esterification of the succinic anhydride and the formation of a diester. The formation of the diester product is undesirable since the diester cannot be intramolecularly cyclized to form the desired lactone.

The intramolecular cyclization step involved in the process of this invention must be carried out in the presence of an acid-type catalyst in order to effect formation of the lactone. Suitable catalysts include the mineral acids such as hydrochloric acid, sulfuric acid, perchloric acid, and phosphoric acid; the sulfonic acids such as the alkanesulfonic acids and the arylsulfonic acids; the Lewis type acids such as aluminum chloride, boron trifluoride, antimony trichloride, and titanium tetrachloride; low molecular weight aliphatic carboxylic acids such as formic and propionic acids; and sulfonic acid type ion exchange resin materials, such as cross-linked sulfonated polystyrene which is commercially available as Dower–50. The alkanesulfonic acid catalysts are preferably the lower alkanesulfonic acids containing from 1 to 12 carbon atoms, for example, methanesulfonic acid, ethanesulfonic acid, propanesulfonic acid, and butanesulfonic acid. If desired, a mixture of lower alkanesulfonic acids can be used and such a mixture containing methane, ethane, and propanesulfonic acids is commercially available. Ordinarily, the alkanesulfonic acid will comprise from 92% to 95% sulfonic acid, from 1 to 2% sulfuric acid, and from 3 to 6% water. The arylsulfonic acid catalyst which can be used in the process includes the benzenesulfonic acids, toluenesulfonic acid, and chloro-benzenesulfonic acids, with p-toluenesulfonic acid and 4-chloro-benzenesulfonic acid being preferred. The amount of catalyst present in the reaction zone can be varied over wide limits depending upon the nature of the reactants and the catalyst used. The amount of catalyst used in also determined to a considerable extent by the temperature selected for conducting the reaction. Thus, at higher temperatures the amount of catalyst required in the reaction zone is smaller than when lower temperatures are used and the use of excessive amounts of catalyst at the more elevated temperatures will promote the formation of undesired side products. Ordinarily, the amount of catalyst used will be between about 0.1% up to 5% by weight of the amount of the alkenyl succinic anhydride reactant.

The partial esterification and the intramolecular cyclization steps involved in the reaction of this invention can be carried out either batchwise or in a continuous manner. If the reactions are carried out batchwise, the partial esterification step is conducted first and after the completion of this step, the catalyst is added to the system in order to effect the intramolecular cyclization. Ordinarily, the partial esterification step will be completed in a period of time of less than approximately ½ hour; however, substantially longer periods of time may be required in some cases with particular reactants. The partial esterification step can be conducted over long periods of time if a suitable low temperature is used and a reaction time as long as 17 hours has been employed without substantial formation of the diester product. After completion of the partial esterification step, the catalyst can be added directly to the reaction zone without effecting any changes in the reaction conditions. If desired, the reaction mixture obtained in the esterification step can be subjected to a separation step to effect removal of any unconverted reactants. Although the catalyst promotes the formation of the diester product when the succinic anhydride and the alcohol reactants are brought together in the presence of the catalyst, there is no substantial formation of the diester product in the intramolecular cyclization step, depending upon the nature of the succinic anhydride, even though there is an excess of the alcohol reactant present in the reaction zone because the intramolecular cyclization step occurs more readily than the partial esterification step under these conditions.

If the process of this invention is carried out in a continuous manner the catalyst is preferably added to the system at a point after substantial completion of the partial esterification step so as not to be present in the system at a place where the partial esterification of the alkenylsuccinic anhydride and the alcohol takes place.

After completion of the intramolecular cyclization step, the reaction mixture is washed first with water to remove the acid catalyst and then with a dilute alkaline solution to remove any remaining catalyst and unreacted acid ester and/or anhydride. Suitable dilute alkaline materials useful for this purpose include aqueous sodium hydroxide, aqueous sodium carbonate, and aqueous calcium hydroxide solutions. After washing, the recovered material is purified in the usual manner by distillation, solvent extraction, or selective adsorption procedures.

The lactone products of this invention are stable liquid compounds which range in color from colorless to a light yellow and which range in viscosity from very fluid to very viscous. The boiling points of these compounds are very high, usually being above 200° C. These lactones have good solvent properties and are soluble in benzene, alcohols, ethers, ketones and the like. Generally, these lactones are insoluble in water although the low molecular weight lactones are somewhat soluble in water.

The lactones of this invention are advantageously used for a variety of industrial purposes as well as intermediates in the formation of other chemical compounds. The γ-valerolactones are characterized by having low volatility and good viscosity characteristics, thereby finding use as functional fluids in hydraulic fluid systems as well as vacuum pump systems. Furthermore, the lactones of this invention find extensive use as plasticizers for various synthetic resins, particularly the polyvinyl halide resins such as polyvinyl chloride, to form softened compositions of increased resiliency and flexibility which is retained at low temperatures as well as at high temperatures. The lactones of this invention are also compatible with other polymers such as polyvinyl butyral, cellulose acetate, cellulose acetate butyrate, polystyrene and certain polyacrylates.

As plasticizers, the γ-valerolactone products of this invention are fully compatible with vinyl halide resins as is apparent by visual inspection of the plasticized compositions. Furthermore, the γ-valerolactones of this invention produce flexible polyvinyl halide compositions at room temperature as well as at lower temperatures where many plasticized polyvinyl halide compositions become very brittle and useless. In addition, the plasticized polyvinyl halide compositions of this invention do not become brittle and useless with age or upon heating because these lactones have very low volatility and are relatively insoluble in water.

The advantages, desirability and usefulness of the present process in the reaction of alkenylsuccinic anhydrides with monohydric alcohols to form lactones, and use in polyvinyl halide compositions, are well illustrated by the following examples.

*Example 1*

In this example, an ester-lactone was prepared from cyclohexenylsuccinic anhydride and n-butanol using 0.227 moles of each reactant. The reactants were placed in a small flask and heated at a temperature of about 120° C. with stirring for a period of 1 hour. Thereafter, the reaction mixture was cooled and 0.5 ml. of 70% perchloric acid added to the reaction flask and the mixture heated for an additional 1.75 hours at a temperature up to 120° C. During this heating step, by the acidity of the reaction mixture was checked periodically by titrating 0.5 ml. portions of the mixture with 0.1095 N sodium hydroxide. At the end of 1.75 hours, the dark brown reaction mixture was dissolved in 50 ml. of ether and washed with 50 ml. of water followed by washing with 50 ml. of 5% sodium hydroxide and two 25 ml. portions of water. The combined water phases were then washed with two 25 ml. portions of ether. The combined ether solutions were then distilled under vacuum through a packed column to obtain the ester-lactone boiling at 135–140° C./0.18–0.13 mm. in an amount of 26.4 g. Analysis of the product was 66.4 wt. percent carbon and 8.85 wt. percent hydrogen as compared with 66.2 wt. percent carbon and 8.7 wt. percent hydrogen calculated for $C_{14}H_{22}O_4$.

*Example 2*

In this example, an ester-lactone was prepared from tetrapropenylsuccinic anhydride and 2-ethylhexanol using ½ mole of each reactant. The reactants were placed in a small flask and heated at a temperature of 110° C. for 1 hour with the formation of a clear yellow solution. Immediately thereafter, 2 ml. of concentrated sulfuric acid was added to the hot reaction flask and the heating continued for a period of 16 hours while maintaining a temperature of 105° C. The dark brown solution formed was diluted with 100 ml. of ether and washed with 100 ml. of water followed by washing with 100 ml. of a 5% solution of sodium hydroxide and another washing with 100 ml. portion of water. The washed solution obtained was dark brown in color and was distilled in a still head to effect removal of the ether and the entrained water. The residue was then distilled at reduced pressure to obtain 146.8 g. of the desired product boiling at 186–191° C./0.09–0.1 mm. and having a refractive index $n_D^{25}$ 1.4623. The yield of the ester-lactone in this example amounted to 74.2%. The product had an analysis of 72.01% by weight carbon and 10.4% by weight hydrogen as compared with an analysis of 72.68% by weight carbon and 11.18% by weight hydrogen calculated for $C_{24}H_{44}O_4$. Infrared analysis showed that the product was free of tetrapropenylsuccinic anhydride.

*Example 3*

In this example, an ester-lactone was prepared from tetrapropenylsuccinic anhydride and "Oxo" decyl alcohol using 0.5 moles of each reactant. The reactants were placed in a small flask and heated at a temperature of 110° C. for a period of 1.25 hours. Thereafter, 2 ml. of concentrated sulfuric acid was added to the hot reaction flask and the heating was continued overnight, with stirring, while maintaining the temperature in the range of 107–110° C. After cooling, the dark colored reaction mixture was diluted with 100 ml. of ether and washed with a 100 ml. portion of 5% sodium hydroxide solution followed by washing with a 100 ml. portion of water. The washed material was then distilled through a still head to remove ether and any dissolved water. The residue was then distilled under vacuum to obtain the ester-lactone boiling at 198–235° C./0.22–0.19 mm. and having a refractive index $n_D^{25}$ 1.4622. The product amounted to 172.6 g.; a yield of 81.4%. Analysis of the product was 75.1 wt. percent carbon and 11.92 wt. percent hydrogen as compared with 73.53 wt. percent carbon and 11.39 wt. percent hydrogen calculated for $C_{28}H_{48}O_4$.

*Example 4*

In this example, 2-(carbodecoxymethyl)-γ-valerolactone was prepared from 70 g. (0.5 mole) of allylsuccinic anhydride and 87 g. (0.55 mole) of "Oxo" decyl alcohol. The reactants were placed in a small reaction flask and heated slowly to a temperature of 125° C. which temperature was maintained for a period of 1.5 hours. Thereafter, the reaction mixture was distilled under vacuum to remove excess alcohol. About 4.5 g. of the clear, colorless product was analyzed and identified as the acid ester of the allylsuccinic anhydride. The remainder of the product was then admixed with 2 ml. of concentrated sulfuric acid and heated for a period of 2 hours while maintaining a temperature of 120–125° C. The reaction mixture, which was dark brown in color, was then diluted with 200 ml. of ether and washed with 100 ml. of water, two 25 ml. portions of 10% sodium hydroxide solution, 100 ml. of water and finally 50 ml. of water. The ether was removed from the washed material by distillation through a still head. The residue was then distilled to obtain a fraction boiling at 176–191° C./0.3–0.45 mm., amounting to 80.2 g. and having a refractive index $n_D^{25}$ 1.4540. This product was identified as the 2-(carbodecoxymethyl)-γ-valerolactone. Analysis of this compound was found to be 69.59 wt. percent carbon and 10.60 wt. percent hydrogen as compared with values of 68.42 wt. percent carbon and 10.14 wt. percent hydrogen, calculated for $C_{17}H_{30}O_4$.

*Example 5*

In this example, 2-carbomethoxymethyl-4-methyl-γ-valerolactone was prepared from 50.8 g. (0.33 mole) of β-methylallylsuccinic anhydride and 14.0 ml. of methanol. The reactants were placed in a reaction flask and heated with refluxing beginning at a temperature of 66° C. In 25 minutes, the temperature was raised to 110° C. and was maintained at a temperature of 105–110° C. for an additional 40 minutes. At this time, 1 ml. of sulfuric acid was added to the reaction mixture which was then further heated at a temperature of 105–110° C. for an additional 4 hours. At the end of this time, the reaction mixture was diluted with ether and contacted with 25 ml. of a 25% sodium carbonate solution. Upon the addition of 20 ml. of water, phase separation occurred. After separation of the phases, the aqueous phase was washed with 20 ml. of ether. The ether solution was then distilled to obtain 54.1 g. of 2-carbomethoxymethyl-4-methyl-γ-valolactone boiling at 144–144.5° C./9 mm. and having a refractive index $n_D^{25}$ 1.4471. The yield was 87%.

*Example 6*

In this example, 75 g. (0.282 mole) of tetrapropenylsuccinic anhydride was reacted with 57 g. (0.282 mole) of tridecyl alcohol having a boiling point of 129–137° C./10 mm. The reactants were heated in a reaction flask for a period of 1.5 hours at a temperature of 100–120° C. At the end of this time, 2 ml. of concentrated sulfuric acid was added and the heating was continued for 17 hours while maintaining the temperature at 122° C. At the end of this time, the dark brown reaction mixture was diluted with 100 ml. of ether and washed with 100 ml. portions each of water, 5% solution of sodium hydroxide, and water. The washed solution was then distilled through a still head to remove ether and the residue distilled under vacuum to obtain 91.4 g. of the product ester-lactone boiling at 215–240° C./0.17–0.11 mm. and having a refractive index $n_D^{25}$ 1.4651. The carbon and hydrogen analysis of this product were found to be 74.20 wt. percent and 10.88 wt. percent, respectively, as compared with calculated values of 74.62 wt. percent carbon and 11.66 wt. percent hydrogen for $C_{29}H_{54}O_4$.

*Example 7*

In this example, 41 g. (0.133 mole) of pentapropenylsuccinic anhydride was reacted with 27 g. (0.133 mole) of redistilled tridecyl alcohol. The reactants were heated in a reaction flask at a temperature of 120° C. for a period of 1.5 hours. Thereafter, 1 ml. of concentrated sulfuric acid was added to the reaction mixture and the heating was continued for a period of 17 hours at a temperature of 118° C. At the end of this time, the reaction mixture was diluted with 50 ml. of ether and then washed with 50 ml. portions each of water, 5% sodium hydroxide solution and water. After distillation through a still head to remove the ether, the residue was distilled under vacuum to obtain 43.2 g. of the product ester-lactone boiling at 217–260° C./0.12 mm. and having a refractive index $n_D^{25}$ 1.4677. The carbon and hydrogen analyses of the product were found to be 75.57 wt. percent and 11.76 wt. percent, respectively, as compared with calculated values of 75.53 wt. percent carbon and 11.89 wt. percent hydrogen for $C_{32}H_{60}O_4$. The product was a yellow oil and was obtained in 63.8% yield.

*Example 8*

In this example, 75 g. (0.282 mole) of tetrapropenylsuccinic anhydride was reacted with 47 g. (0.282 mole) of 2-hydroxyethyl benzoate. The reactants were heated in a reaction flask for a period of 1.5 hours at a temperature of 120° C. At the end of this time, 2 ml. of concentrated sulfuric acid was added and the mixture was further heated for a period of 4 hours at a temperature of 120° C. The thick, dark reaction mixture obtained was then diluted with 100 ml. of ether and washed with 100 ml. portions each of water, 5% sodium hydroxide solution, and water. The washed product was distilled through a still head to remove ether and the residue obtained was then distilled under vacuum to obtain 42.8 g. of the product ester-lactone boiling at 238–275° C./0.15 mm. and having a refractive index $n_D^{25}$ 1.5003. The carbon and hydrogen analyses of the product were found to be 69.57 wt. percent and 8.27 wt. percent, respectively, as compared with values of 69.42 wt. percent and 8.39 wt. percent, respectively, calculated for $C_{25}H_{36}O_6$.

*Example 9*

In this example, 75 g. (0.282 mole) of tetrapropenylsuccinic anhydride was reacted with 61 g. (0.282 mole) of 7-ethyl-2-methylundecanol-4 having a boiling point of 133.5–135.5° C./10 mm. The reactants were heated in a reaction flask at a temperature of 110–120° C. for a period of 2.5 hours. At the end of this time, 2 ml. of concentrated sulfuric acid was added and the reaction mixture heated for an additional 16.5 hours at a temperature of 110–120° C. The dark colored reaction mixture was then diluted with 100 ml. of ether and washed with 100 ml. of water followed by washing with 150 ml. of 10% sodium hydroxide solution and then with approximately 100 ml. of water. The washed reaction mixture was then distilled through a still head to remove the ether and the residue distilled under vacuum to recover 8.3 g. boiling at 189–209° C./0.1 mm. The carbon and hydrogen analyses of the product were found to be 75.27 wt. percent and 11.68 wt. percent, respectively, as compared with calculated values of 74.95 wt. percent and 11.74 wt. percent, respectively, for $C_{30}H_{36}O_4$.

*Example 10*

In this example, 2-carbodecoxymethyl-4-hexadecyl-γ-butyrolactone was prepared from 50 g. (0.143 mole) of octadecenylsuccinic anhydride and 29 g. (0.183 mole) of decyl alcohol. The reactants were placed in a reaction flask and heated at a temperature of 110–120° C. for a period of 2.5 hours. At the end of this time, about 5 g. of unreacted decyl alcohol was removed under a vacuum of 0.2 mm. of Hg at a temperature of 140° C. Then 1 ml. of concentrated sulfuric acid was added to the remaining reaction mixture which was heated at a temperature of 110–120° C. for a period of 16.5 hours. Thereafter, the mushy, solid reaction mixture was diluted with 200 ml. of ether and washed with water and a 5% sodium hydroxide solution. The recovered solution was distilled through a still head to remove ether and the residue was then distilled under vacuum to obtain 24.0 g. of 2-carbodecoxymethyl-4-hexadecyl-γ-butyrolactone boiling at 270–284° C./0.25–0.3 mm. and having a refractive index $n_D^{25}$ 1.4806. This product was a yellow oil and the carbon and hydrogen analyses of the product were found to be 76.17 wt. percent and 12.38 wt. percent, respectively, as compared with values of 75.53 wt. percent and 11.88 wt. percent respectively, calculated for $C_{32}H_{60}O_4$.

*Example 11*

In this example, 133 g. (0.5 mole) of tetrapropenylsuccinic anhydride was reacted with 64 g. (0.5 mole) of redistilled 1-methylcyclohexylmethanol having a boiling point at 80–82° C./9 mm. Hg. The reactants were placed in a reaction flask and heated at a temperature of 120° C. for a period of 2 hours. At the end of this time, 2 ml. of benzenesulfonic acid was added and the heating was continued at a temperature of 120° C. for a further period of 16.5 hours. Thereafter, the thick, dark reaction solution was diluted with 100 ml. of ether and washed with 100 ml. of water followed by washing with two 100 ml. portions of 5% sodium hydroxide solution and finally with 100 ml. of water. After removal of ether by distillation through a still head, 110 g. of the product ester-lactone was obtained having a boiling point of 202–216° C./0.47–0.4 mm. Hg and having a refractive index $n_D^{25}$ 1.4779. The carbon and hydrogen analyses of the product were found to be 73.20 wt. percent and 10.69 wt. percent, respectively, as compared with values of 73.05 wt. percent and 10.73 wt. percent, respectively, calculated for $C_{24}H_{42}O_4$.

*Example 12*

In this example, 100 g. (0.376 mole) of tetrapropenylsuccinic anhydride was reacted with 78 g. (0.78 mole) of cyclohexanol. The reactants were heated in a reaction flask for a period of 2 hours at a temperature of about 120° C. and, at the end of this time, the excess cyclohexanol was removed under vacuum. Thereafter, 2 ml. of benzene sulfonic acid was added to the reaction mixture and the heating was continued for a period of 16 hours while maintaining the temperature at 110–120° C. The dark colored reaction mixture was then cooled and diluted with 100 ml. of ether. The ether solution was then washed with 100 ml. of water, followed by washing with 100 ml. of sodium hydroxide solution, 50 ml. more of sodium hydroxide solution, and finally with 100 ml. of water. The recovered solution was distilled through a still head to remove ether and the residue was distilled under vacuum to obtain 54 g. of the product ester-lactone having a boiling point of 191–199° C./0.3–1.2 mm. and a refractive index $n_D^{25}$ 1.4774. The carbon and hydrogen analyses of the product were found to be 72.31 wt. percent and 10.57 wt. percent, respectively, as compared with values of 72.09 wt. percent and 10.45 wt. percent, respectively, calculated for $C_{22}H_{38}O_4$.

*Example 13*

In this example, 75 g. (0.282 mole) of tetrapropenylsuccinic anhydride was reacted with 116 g. of a heavy "Oxo" fraction (calculated 20% excess alcohol). The reactants were heated in a reaction flask at a temperature of 120° C. for a period of 2 hours. Thereafter, 2 ml. of benzenesulfonic acid was added and the heating was continued for a period of 16.75 hours while maintaining the temperature at 120° C. Thereafter, the mixture was diluted with 100 ml. of ether and washed respectively with 100 ml. of 5% sodium hydroxide solution and 100 ml. of water. The recovered washed material was distilled through a still head to remove the ether and the residue was distilled under vacuum to obtain 72 g. of the product ester-lactone boiling at 200–276° C./0.26–0.60 mm. and having a refractive index $n_D^{25}$ 1.4622. The carbon and hydrogen analyses of the product were 74.76 wt. percent and 11.76 wt. percent, respectively, as compared with values of 73.92 wt. percent and 11.47 wt. percent, respectively, calculated for $C_{27}H_{50}O_4$, indicating the heavy "Oxo" fraction to correspond roughly to a $C_{11}$ alcohol.

*Example 14*

In this example, 70 g. (0.33 mole) of redistilled diisobutenylsuccinic anhydride having a boiling point of 150–157° C./3.5–2.0 mm. was reacted with 67 g. (0.33 mole) of redistilled tridecyl alcohol having a boiling point of 128–136° C./10 mm. These reactants were heated in a reaction flask at a temperature of 120° C. for 2.5 hours. Thereafter, 2 ml. of benzenesulfonic acid was added and the heating was continued for a period of 16.25 hours while maintaining the temperature at 120° C. At the end of this time, the reaction mixture was diluted with ether and washed with 100 ml. portions each of water, 10% sodium hydroxide solution, and water. After removal of the ether through a still head, the residue was distilled under vacuum to obtain 105 g. of the ester-lactone product boiling at 207–237° C./0.7–0.5 mm. and having a refractive index $n_D^{25}$ 1.4616. The yield was 77.7%. The carbon and hydrogen analyses of the product were 73.72 wt. percent and 11.40 wt. percent, respectively, as compared with values of 73.12 wt. percent and 11.29 wt. percent, respectively, calculated for $C_{25}H_{46}O_4$.

*Example 15*

In this example, 100 g. (0.276 mole) of tetrapropenylsuccinic anhydride was reacted with 35 g. (0.386 mole) of phenol. The reactants were heated in a reaction flask at a temperature of 120° C. for a period of 2.33 hours. Thereafter, 2 ml. of benzensulfonic acid was added and the heating was continued at a temperature of 120° C. for a period of 16.75 hours. At the end of this time, the thick dark reaction mixture was dissolved in 100 ml. of ether and washed with 100 ml. of water followed by washing with 200 ml. of a 5% sodium hydroxide solution in three portions, and finally with 100 ml. of water. After removal of the ether by distillation through a still head, the residue was distilled under vacuum to obtain a 40 g. fraction boiling at 178–210° C./0.7 mm. This fraction was redistilled to obtain 33 g. of the product lactone boiling at 187–235° C./0.2 mm. and having a refractive index $n_D^{25}$ 1.5069. The carbon and hydrogen analyses of the product were 74.85 wt. percent and 9.10 wt. percent, respectively, as compared with values of 73.30 wt. percent and 8.97 wt. percent, respectively, calculated for $C_{22}H_{32}O_4$.

*Example 16*

In this example, 75 g. (0.19 mole) of methyl oleate-maleic anhydride adduct was reacted with 16 ml. (0.38 mole) of methyl alcohol. The reactants were placed in a reaction flask and heated slowly with refluxing until the temperature rose to 95.5° C. after a period of 2.5 hours. The heating was continued for a period of 4.5 hours and the excess methyl alcohol was permitted to distill out. At the end of this time, the temperature was 150° C. After cooling, 1 g. of p-toluenesulfonic acid was added to the mixture and the mixture was again heated at a temperature of 110–120° C. for a period of 16 hours. At the end of this time, the dark brown reaction mixture was diluted with 100 ml. of ether. The ether solution was then washed with four 50 ml. portions of water. The washed solution was then distilled through a still head to remove ether and the residue distilled through a film still at a temperature of 150° C./0.03 mm. to obtain 56 g. of a residue fraction. The residue was then redistilled at a temperature of 200° C./0.02 mm. to obtain 52 g. of the ester-lactone product. The carbon and hydrogen analyses of the product were found to be 67.75 wt. percent and 9.74 wt. percent, respectively, as compared with values of 67.57 wt. percent and 9.93 wt. percent, respectively, calculated for $C_{24}H_{42}O_6$.

*Example 17*

In this example, 75 g. (0.282 mole) of tetrapropenylsuccinic anhydride was reacted with 27 ml. (0.282 mole) redistilled 2-ethoxyethanol. These reactants were heated in a reaction flask at a temperature of 120° C. for a period of 2.5 hours. Thereafter, 1 g. of p-toluenesulfonic acid was added to the reaction mixture and the heating was continued for a period of 16.5 hours while maintaining a temperature of 120° C. At the end of this time, the reaction mass was diluted with ethyl ether and washed with successive 100 ml. portions each of water, 10% sodium hydroxide solution, and water. Thereafter, the ether was removed by distillation through a still head and the residue was distilled under reduced pressure to obtain 63 g. of the ester-lactone product boiling at 172–182° C./0.2–0.12 mm. and having a refractive index $n_D^{25}$ 1.4622. The yield of the product was 63%. The carbon and hydrogen analyses of the product were 67.53 wt. percent and 10.08 wt. percent, respectively, as compared with values of 67.38 wt. percent and 10.18 wt. percent, respectively, calculated for $C_{20}H_{36}O_5$.

*Example 18*

In this example, 75 g. (0.282 mole) of tetrapropenylsuccinic anhydride was reacted with 33 g. (0.282 mole) of redistilled 2-butoxyethanol. The reactants were heated in a reaction flask at about 120° C. for a period of 2.5 hours. Thereafter, 2 ml. of benzenesulfonic acid was added and the heating was continued for a period of 16 hours while maintaining the temperature at approximately 120° C. The dark reaction mixture was diluted with ethyl ether and washed with successive 100 ml. portions each of water, 10% sodium hydroxide solution, and water. The recovered washed material was distilled through a still head to remove the ether and the residue distilled under vacuum to obtain 68.8 g. of the ester-lactone product boiling at 187–203° C./0.3–0.2 mm. and having a refractive index $n_D^{25}$ 1.4610. The yield of the product was 63.4%. The carbon and hydrogen analyses of the product were 68.90 wt. percent and 10.64 wt. percent, respectively, as compared with values of 68.71 wt. percent and 10.49 wt. percent, respectively, calculated for $C_{22}H_{40}O_5$.

*Example 19*

In this example, 75 g. of tetrapropenylsuccinic anhydride and 38 g. (0.282 mole) of redistilled 2-(ethoxyethoxy)ethanol were reacted together in a reaction flask at a temperature of 120° C. for a period of 2.5 hours. At the end of this time, 2 g. of p-toluenesulfonic acid was added to the reaction mixture and the heating was continued for a period of 16.5 hours while maintaining the temperature at 120° C. The dark reaction mixture obtained was dissolved in 100 ml. of ether. The ether solution was washed with 100 ml. of 5% sodium hydroxide solution to form a single brown layer. Phase separation was effected by the addition of sodium chloride. The water phase was separated and diluted with 300 ml. of water, followed by extraction with four 50 ml. portions of ethyl acetate. The ethyl acetate-ether solution was then distilled to obtain a residue which was distilled in a film still at a temperature of 200° C./0.01 m. to obtain 15 g. of the ester-lactone product having an orange-yellow color. The carbon and hydrogen analyses of the product were 67.11 wt. percent and 10.18 wt. percent, respectively, as compared with values of 65.97 wt. percent and 10.07 wt. percent respectively, calculated for $C_{22}H_{40}O_6$.

*Example 20*

In this example, 100 g. of triisobutenylsuccinic anhydride was reacted with 75 g. of tridecyl alcohol, using 0.376 mole of each reactant. The reactants were heated in a reaction flask at a temperature of 120° C. for a period of 4.5 hours. Thereafter, 2 g. of p-toluenesulfonic acid was added and heating was continued for an additional 16.5 hours while maintaining the temperature at 120° C. At the end of this time, the reaction mixture was dissolved in 100 ml. of ethyl acetate and washed with dilute sodium hydroxide solution. The solution obtained was then distilled through a still head to remove solvent and water and the residue distilled under vacuum to obtain a small fore-fraction boiling between 150° C.–210° C./0.6 mm. The residue was then passed three times through a film still operated at temperatures of 150° C./0.06–0.04 mm., 220° C./0.03 mm., and 220° C./0.03 mm. to obtain 70 g. of the ester-lactone product which is orange-yellow in color. The carbon and hydrogen analyses of this product were found to be 77.51 wt. percent and 12.36 wt. percent, respectively, as compared with values of 74.62 wt. percent and 11.66 wt. percent, respectively, calculated for $C_{29}H_{54}O_4$.

*Example 21*

In this example, 200 g. (0.75 mole) of tetrapropenylsuccinic anhydride was reacted with 61 g. (0.75 mole) of ethylene chlorohydrin. The reactants were heated in a reaction flask at a temperature of 120° C. for a period of 2 hours. At the end of this time 2 ml. of benzenesulfonic acid was added and the heating was continued for a period of 16 hours while maintaining the temperature at 120° C. At the end of this time, the dark, viscous reaction mixture was diluted with 200 ml. of ether and washed successively with 100 ml. of water, two 50 ml. portions of a 5% sodium hydroxide solution and two 100 ml. portions of water. Distillation of the washed material through a still head gave 170 g. of the ester-lactone product boiling at 180–190° C./0.18–0.25 mm. and having a refractive index $n_D^{25}$ 1.4753. The carbon and hydrogen analyses of this product were found to be 61.97 wt. percent and 9.14 wt. percent, respectively, as compared with values of 64.2 wt. percent and 6.3 wt. percent, respectively, calculated for $C_{18}H_{31}ClO_4$.

*Example 22*

In this example, 200 g. (0.752 mole) of tetrapropenylsuccinic anhydride was reacted with 119 g. (0.752 mole) of "Oxo" decyl alcohol. The reactants were heated in a reaction flask at a temperature of 120° C. for a period of 2.5 hours. Thereafter, anhydrous hydrogen chloride was bubbled into the reaction mixture maintained at a temperature of 120° C. for a period of 2 hours. At this time, the introduction of hydrogen chloride was discontinued and the reaction mixture was heated for an additional 16.5 hours with stirring. The dark brown reaction mixture obtained was then washed with dilute sodium hydroxide and water and distilled in three passes through a film still to obtain 142 g. of the ester-lactone product boiling at 180° C./0.04 mm. and having a refractive index $n_D^{25}$ 1.4639. The product was yellow in color and had carbon and hydrogen analyses of 73.66 wt. percent and 11.70 wt. percent respectively, as compared with values of 73.53 wt. percent and 11.39 wt. percent respectively, calculated for $C_{26}H_{48}O_4$.

*Example 23*

In this example, 50 g. (0.188 mole) of tetrapropenylsuccinic anhydride, 13.5 g. (0.188 mole) of butyl alcohol, and 2 ml. of concentrated sulfuric acid were heated for a period of 17 hours at a temperature of 120° C. At the end of this time, the reaction mixture, which was dark in color, was dissolved in 50 ml. ether and washed with two 50 ml. portions of 10% sodium carbonate solution. The solution was then distilled through a still head to obtain after removal of ether 52.6 g. of the lactone boiling at 163–170° C./0.06 mm. and having a refractive index $n_D^{25}$ 1.4597. This product was found to have an analysis of 70.70% by weight carbon and 10.81% by weight hydrogen as compared with values of 70.54% by weight carbon and 10.66% by weight hydrogen calculated for $C_{20}H_{36}O_4$. Infrared analysis of the product proved the absence of tetrapropenylsuccinic anhydride.

*Example 24*

In this example, 56.3 g. (0.14 mole) of methyl oleate-maleic anhydride adduct was reacted with 6 ml. (0.14 mole) of methyl alcohol. The reactants were placed in a reaction flask and heated slowly with refluxing until the temperature rose to 120° C. during a period of ½ hour. The heating was then continued for a period of 1.5 hours while maintaining the temperature at approximately 120° C. At the end of this time, the reaction mixture was cooled and 0.3 ml. of 70% perchloric acid added to the reaction mixture. The reaction mixture was again heated for a period of approximately 2.5 hours at a temperature up to 120° C. During this heating step, the drop in acidity of the reaction mixture was followed by titrating 0.5 ml. samples of the reaction mixture was followed by titrating 0.5 ml. samples of the reaction mixture with 0.1057 N sodium hydroxide. Upon completion of the reaction, the dark brown reaction mixture was dissolved in 50 ml. of ether and washed with 75 ml. of 5% sodium hydroxide. The ether phase was then separated and washed with two 25 ml. portions of water. The combined water phases were washed with two 25 ml. portions of ether. The combined ether solution was distilled through a still head to remove the ether and to obtain 25.0 g. of a fraction boiling at 214–246° C./0.3–0.45 mm. This fraction was redistilled through the still head to obtain 11.8 g. of the ester-lactone boiling at 128–233° C./0.2 mm. and having a refractive index $n_D^{25}$ 1.4650. The carbon and hydrogen analyses of the diester-lactone product were found to be 67.72 wt. percent carbon and 9.96 wt. percent hydrogen as compared with values of 67.57 wt. percent carbon and 9.93 wt. percent hydrogen calculated for $C_{24}H_{42}O_6$.

*Example 25*

In this example, 0.188 mole of each of dodecenylsuccinic anhydride and redistilled 2-ethylhexanol were reacted together to form the ester-lactone. These reactants were heated in a reaction flask at a temperature of approximately 120° C. for a period of approximately 1.5 hours. Thereafter, the reaction mixture was cooled and 0.6 ml. of 70% perchloric acid added to the reaction mixture. The reaction mixture was then heated for 2 hours and 20 minutes at a temperature up to 120° C. During this heating step, the drop in acidity of the reaction mixture was checked periodically by titrating 0.5 ml. portions of the reaction mixture with 0.015 N sodium hydroxide. Upon completion of the reaction, the dark brown reaction mixture was diluted with ethyl ether and washed successively with 100 ml. portions each of water, 10% sodium hydroxide solution and water. The ether solution was then distilled through a still head to obtain 39.5 g. of a fraction boiling at 201–225° C./0.2–0.33 mm. Upon cooling, a light solid material precipitated in the recovered fraction and this precipitate was removed by filtration to obtain the pure ester-lactone. The carbon and hydrogen analyses of the product were 73.01 wt. percent carbon and 11.17 wt. percent hydrogen as compared with values of 72.68 wt. percent carbon and 11.18 wt. percent hydrogen calculated for $C_{24}H_{44}O_4$.

*Example 26*

In this example, 280 g. of tetrapropenylsuccinic anhydride was reacted with 200 g. of tridecanol. These reactants were heated in a reaction flask at a temperature of 120° C. for a period of 1.25 hours. Thereafter, the reaction mixture was cooled to 55° C. and 2.1 ml. of 72% perchloric acid added. The reaction mixture was then heated for a period of 2 hours and 20 minutes at a temperature up to 120° C. During this second heating step, the drop in acidity of the reaction mixture was checked periodically by titrating 0.5 ml. portions of the reaction mixture with standard sodium hydroxide. Upon completion of the reaction, the dark brown colored reaction mixture was dissolved in 230 ml. of ether and washed successively with 300 ml. of 5% sodium hydroxide solution, 100 ml. of water and 50 ml. of water. The combined water phases were then washed with two 50 ml. portions of ether. The combined ether solutions were distilled through a still head to obtain 335 g. of a fraction boiling at 208–250° C./0.4–0.38 mm. This fraction was redistilled to obtain a 264 g. fraction boiling at 213–227° C./0.28–0.20 mm. This fraction was then heated with 1.3 g. of activated charcoal at a temperature of 75–80° C. for a period of 1 hour. At the end of this time, the charcoal was removed by filtration to obtain 253 g. of the ester-lactone which is a light yellow colored liquid. Analysis of the product was found to be 74.67 wt. percent carbon and 11.87 wt. percent hydrogen as compared with calculated values of 74.62 wt. percent carbon and 11.66 wt. percent hydrogen, calculated for $C_{29}H_{54}O_4$.

*Example 27*

In this example, 186 g. (1 mole) of lauryl alcohol was reacted with 280 g. (1.05 mole) of tetrapropenylsuccinic anhydride. These reactants were heated in a reaction flask for a period of approximately 1 hour at a temperature of 120° C. Thereafter, the reaction mixture was cooled and 2 ml. of 70% perchloric acid added to the reaction flask. The reaction mixture was then heated for an additional 2 hours at a temperature up to 120° C. During this second heating step, the fall in acidity of the reaction mixture was checked periodically by titrating 0.5 ml. samples of the reaction mixture with 0.1057 N sodium hydroxide. Upon completion of the reaction, the dark colored reaction mixture was dissolved in 200 ml. of ether and washed successively with 100 ml. water, 250 ml. of 5% sodium hydroxide, 100 ml. of water, and 50 ml. of water. The combined water phases were then washed with 100 and 50 ml. portions of ether. The ether solutions were distilled through a still head to obtain 260 g. of the ester-lactone boiling at 226–246° C./0.45–0.42 mm. Analysis of the product was found to be 74.42 wt. percent carbon and 11.37 wt. percent hydrogen as compared with values of 74.28 wt. percent carbon and 11.58 wt. percent hydrogen calculated for $C_{28}H_{52}O_4$.

*Example 28*

In this example, 80.3 g. (0.30 mole) of tetrapropenylsuccinic anhydride was reacted with 34 ml. of benzyl alcohol. These reactants were heated in a reaction flask at a temperature of 120° C. for 1 hour. Thereafter, the mixture was distilled under reduced pressure to remove the excess alcohol amounting to 4.6 g. Concentrated sulfuric acid in an amount of 1 ml. was then added to the reaction mixture as a catalyst and the heating continued for a period of 5 hours while maintaining the temperature at approximately 120° C. At the end of this time, the dark colored reaction mixture was diluted with 200 ml. of benzene and washed successively with 100 ml. of water, a 100 ml. of 5% sodium hydroxide solution, 100 ml. of 5% sodium hydroxide solution and 100 ml. of water. The benzene solution was then distilled through a still head to obtain 39.2 g. of the ester-lactone boiling at 191–248° C./0.1 mm. having a refractive index $n_D^{25}$ 1.5053. Analysis of this product was found to be 74.42 wt. percent carbon and 9.15 wt. percent hydrogen as compared with values of 73.76 wt. percent carbon and 9.15 wt. percent hydrogen calculated for $C_{23}H_{34}O_4$. The proposed structure for the ester-lactone was confirmed from an inspection of the infrared spectrum of the compound.

*Example 29*

In this example, 51 g. (0.33 mole) of methylallylsuccinic anhydride was reacted with 14.1 ml. of methanol (5% excess). These reactants were heated in a reaction flask at a temperature up to 105° C. for a period of 1 hour and 20 minutes. Thereafter, 5 g. of Amberlite IR–120 ion exchange resin in the acid form was added to the reaction mixture which was then heated at a temperature of 110–130° C. for a period of 1.5 hours. At the end of this time, the dark colored reaction mixture was filtered, and contacted with 10 ml. of 50% potassium carbonate solution. The oil phase was dissolved in ether and washed with water. The ether solution was then contacted with magnesium sulfate which was separated by filtration. The ether solution was distilled to obtain 40.2 g. of the ester-lactone boiling at 142–144.5 C./9 mm. having a refractive index $n_D^{25}$ 1.4471. Analysis of this product gave 58.25 wt. percent carbon and 7.82 wt. percent hydrogen as compared with values of 58.05 wt. percent carbon and 7.58 wt. percent hydrogen calculated for $C_9H_{14}O_4$. The proposed structure of the ester-lactone was confirmed by inspection of the infrared spectrum of the product.

*Example 30*

In this example, the plasticizer properties of several of the ester-lactone products of this invention were determined for use in polyvinyl chloride resins. These resin compositions comprised 60 parts of the polyvinyl chloride resin and 40 parts of the candidate plasticizer, including ¼ PHR of dibasic lead stearate as a heat stabilizer. These materials were mixed on a rolling mill to form a homogeneous blend and visual inspection of the compositions indicated that all of the candidate plasticizers were compatible with polyvinyl chloride. Molded sheets from all of the milled mixtures were clear and transparent. The low-temperature flex point, volatility, water extraction, and gerosene extraction for these compositions in the form of a molded sheet was determined and are reported in the following table:

|  | Low Temp. Flex, °C. | Volatility, Percent Lost | Water Extraction, Percent Sol. Matter Lost | Kerosene Extraction, Percent Plasticizer Lost |
| --- | --- | --- | --- | --- |
| Ester lactone from tetrapropenyl-succinic anhydride and "Oxo" tridecanol | −18 | 1.7 | 0.09 | 0.02 |
| Ester lactone from pentapropenyl-succinic anhydride and "Oxo" tridecanol | −18 | 1.4 | 0.07 |  |
| Ester lactone from tetrapropenyl-succinic anhydride and 2-hydroxy-ethyl benzoate | +7 | 1.4 | 0.15 | 0.91 |
| Ester lactone from tetrapropenyl-succinic anhydride and 2-ethyl-hexanol | −22 | 3.0 |  | (¹) |
| Ester lactone from tetrapropenyl-succinic anhydride and "Oxo" decyl alcohol | −21 | 1.94 |  | 1.0 |
| Ester lactone from tetrapropenyl-succinic anhydride and benzyl alcohol | −0.5 | 2.7 |  | 1.2 |

¹ Slight gain.

In these tests, the low temperature flexibility was determined according to the Clash-Berg method wherein the tortional flexibility of the sample is determined at various temperatures. This value may be defined as the lower temperature limit for use of the plasticized compositions as an elastomer. The volatility was determined according to the Carbon Absorption Method of the Society of the Plastics Industry. The amount of water extraction and kerosene extraction was determined by immersion of a sample in distilled water and kerosene for a period of 24 hours, followed by a determination of the loss in weight of the sample.

While the above example shows only compositions in which the ratio of plasticizer to ester-lactone product is 40:60 this ratio being employed in order to get comparable efficiencies, the ratio of ester-lactone product to polyvinyl chloride may be varied over a wide range, depending upon the properties desired in the vinyl resin product. For some purposes, a plasticizer content of say from only 2 to 5% would be desirable; however, usually a plasticizer content above 10% is used. The present ester-lactone products are compatible with polyvinyl chloride over wide ranges in concentration up to 50% of ester-lactone product based on the total weight of the plasticizer composition.

The invention has been described particularly with reference to the use of the present ester-lactone products as plasticizers for polyvinyl chloride, but these ester-lactone products are also advantageously employed as plasticizers for copolymers of vinyl chloride, for example, vinyl chloride-vinyl acetate copolymers, vinyl chloride-acrylonitrile copolymers, vinyl chloride-vinylidene chloride copolymers, vinyl chloride-vinylidene chloride-acrylonitrile copolymers and the like. Preferably, such copolymers have a vinyl chloride content of at least 70% by weight and up to 30% by weight of the copolymerizable monomer.

The plasticized polyvinyl halide compositions of the present invention have good thermal stability; however, it may be desirable for various purposes to include known stabilizers in the plasticized compositions. Inasmuch as the present ester-lactone products are substantially unreactive with the commercially available heat and light stabilizers which are commonly employed with polyvinyl halide resins, the presence of such materials in the plasticized compositions does not impair the valuable properties of the ester-lactone products.

The ester-lactones of this invention, either singularly or in combination, are incorporated with the polyvinyl halide resin to form a plasticized polyvinyl halide resin by either milling or by dissolving therein the plasticizer in a mutual solvent and allowing the solvent to evaporate, or by any other conventional technique. Colors, dyes, extenders, pigments and other compounding ingredients can be included in the plasticized polyvinyl halide composition if it is so desired.

Reasonable variation and modification of the invention as described are possible, the essence of which is that there have been provided: (1) a process for esterifying alkenylsuccinic anhydrides to form the unsaturated acid esters thereof, (2) a process for reacting an alkenylsuccinic anhydride with a monohydric alcohol to form an ester-lactone, (3) said ester-lactones as new products, (4) methods for plasticizing polyvinyl halide resins by incorporating therewith a plasticizing amount of said ester-lactones, and (5) plasticized polyvinyl halide compositions containing a plasticizing amount of said ester-lactones.

We claim:

1. The method for producing an ester lactone, wherein the lactone has from 3 to 4 carbon atoms in the lactone ring in addition to the group —CO—O—; comprising the reaction of about 1 mole of a 2-alkenylsuccinic anhydride, free from non-benzenoid unsaturation apart from the 2-alkenyl group, with about 1 mole of a monohydric alcohol containing less than 18 carbon atoms, said alcohol consisting solely of carbon, hydrogen and oxygen atoms, to effect the esterification of one carboxyl group of the anhydride, then effecting the formation of an intramolecular ester by the reaction of the second carboxyl group with the unsaturated 2-alkenyl group in the presence of from about 0.1 to about 5 weight percent, based on the anhydride reactant, of an acid catalyst at a temperature from about room temperature to about 150° C. to form the ester lactone product.

2. The method for producing an ester-substituted lactone of a 2-alkenylsuccinic anhydride and a monohydric alcohol, said method comprising reacting said 2-alkenylsuccinic anhydride with said monohydric alcohol in the absence of a catalyst and then continuing said reacting of said 2-alkenylsuccinic anhydride and said monohydric alcohol in the presence of an acid catalyst to form said ester-substituted lactone, and recovering said ester-substituted lactone as product.

3. The method of claim 2 wherein said reacting is carried out at a temperature below 150° C.

4. The method of claim 3 wherein said acid catalyst is selected from the group consisting of mineral acids, sulfonic acids, Lewis acids, and sulfonic acid type ion exchange resins.

5. The method for producing an ester-lactone of a 2-alkenylsuccinic anhydride and a monohydric alcohol, said method comprising esterifying said 2-alkenylsuccinic anhydride with said monohydric alcohol under esterification conditions in the presence of a catalyst to form an acid ester of said 2-alkenylsuccinic anhydride, intramolecularly cyclizing said acid ester in the presence of an acid catalyst to form an ester-substituted lactone, and recovering said ester-substituted lactone as product.

6. The method for producing an ester-substituted lactone of a 2-alkenylsuccinic anhydride and a monohydric alcohol, said method comprising esterifying a 2-alkenylsuccinic anhydride with a monohydric alcohol in the absence of a catalyst at a temperature below 150° C. to form the acid-ester product, and intramolecularly cyclizing the acid-ester product of the 2-alkenylsuccinic anhydride and said monohydric alcohol in the presence of an acid catalyst, and recovering said ester-substituted lactone as product.

7. The method of claim 6 wherein said acid catalyst is selected from the group consisting of mineral acids, sulfonic acids, Lewis acids, and sulfonic acid type ion exchange resins.

References Cited in the file of this patent

UNITED STATES PATENTS

| | | |
|---|---|---|
| 2,774,771 | Longley | Dec. 18, 1956 |
| 2,776,300 | Jenkins | Jan. 1, 1957 |
| 2,837,537 | Russell et al. | June 3, 1958 |
| 2,842,512 | Jezl | July 8, 1958 |
| 2,850,470 | Roeser | Sept. 2, 1958 |

OTHER REFERENCES

Beilstein: Handbuch der Org. Chemie, vol. 18 (1934), first work, page 374.

Beilstein: Handbuch der Org. Chemie, vol. 18 (1934), first work, page 387.